United States Patent [19]

Moshier

[11] Patent Number: 4,489,435
[45] Date of Patent: Dec. 18, 1984

[54] METHOD AND APPARATUS FOR CONTINUOUS WORD STRING RECOGNITION

[75] Inventor: Stephen L. Moshier, Cambridge, Mass.

[73] Assignee: Exxon Corporation, New York, N.Y.

[21] Appl. No.: 309,208

[22] Filed: Oct. 5, 1981

[51] Int. Cl.³ ............................................. G10L 1/00
[52] U.S. Cl. ................................... 381/43; 364/513.5
[58] Field of Search .................... 179/1 SD, 1 SB; 364/513; 381/41–43

[56] References Cited

U.S. PATENT DOCUMENTS

| | | | |
|---|---|---|---|
| 3,816,722 | 6/1974 | Sakoe et al. | 232/152 |
| 4,038,503 | 7/1977 | Moshier | 179/1 |
| 4,049,913 | 9/1977 | Sakoe | 179/1 |
| 4,059,725 | 11/1977 | Sakoe | 179/1.5 |
| 4,107,460 | 8/1978 | Grunza et al. | 179/1 SD |
| 4,156,868 | 5/1979 | Levinson | 179/1 SD |
| 4,227,176 | 10/1980 | Moshier | 340/146.3 |
| 4,227,177 | 10/1980 | Moshier | 340/146.3 |
| 4,241,329 | 12/1980 | Bahler et al. | 340/146.3 |
| 4,282,403 | 8/1981 | Sakoe | 179/1 |
| 4,282,405 | 8/1981 | Taguchi | 179/1 |
| 4,301,329 | 11/1981 | Taguchi | 179/1 |

Primary Examiner—E. S. Matt Kemeny
Attorney, Agent, or Firm—Lahive & Cockfield

[57] ABSTRACT

A speech recognition method and apparatus for recognizing word strings in a continuous audio signal are disclosed. The word strings are made up of a plurality of elements, and each element, generally a word, is represented by an element template defined by a plurality of target patterns. Each target pattern is represented by a plurality of statistics describing the expected behavior of a group of spectra selected from plural short-term spectra generated by processing of the incoming audio. Each target pattern has associated therewith at least one required dwell time position and at least one optional dwell time position. The number of required dwell time positions and the sum of the required and optional dwell time positions define, in effect, the limits of a time interval during which a given target pattern can be said to match an incoming sequence of frame patterns. The incoming audio spectra are processed to enhance the separation between the spectral pattern classes during later analysis. The processed audio spectra are grouped into multi-frame spectral patterns and are compared, using likelihood statistics, with the target patterns of the element templates. Each multi-frame pattern input, which inputs occur at a frame rate which requires each keyword target pattern to correspond to at least two of the multi-frame patterns, is forced to contribute to each of a plurality of pattern scores as represented by the element templates. The contributions of said multi-frame pattern inputs to said pattern scores is controlled, in part, by said required and optional dwell time constraints. A concatenation technique is employed, using dynamic programming techniques, to determine the correct identity of the word string.

16 Claims, 11 Drawing Figures

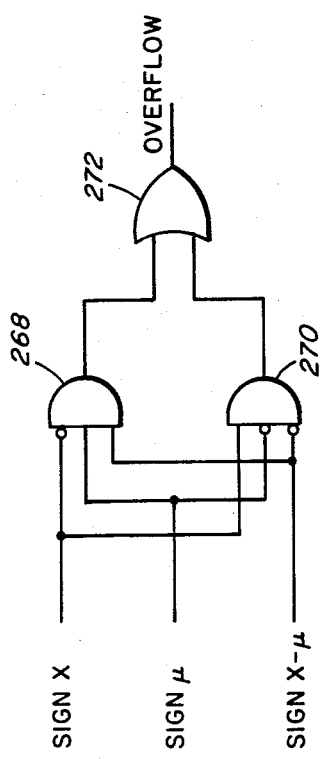

METHOD AND APPARATUS FOR CONTINUOUS WORD STRING RECOGNITION

BACKGROUND OF THE INVENTION

Appendices 1, 2, and 3 have been submitted with the application for entry and availability in the application file, but for convenience, have not been submitted for publication. The appendices are available on microfiche. There are 15 microfiche and a total of 731 frames.

This application is related to U.S. application Ser. No. 308,891, for "Speech Recognition Method and Apparatus", filed Oct. 5, 1981, in the name of Stephen L. Moshier and assigned to the assignee of this application.

The present invention relates to a speech recognition method and apparatus, and more particularly to a method of and apparatus for recognizing in real time, word strings in a continuous audio signal.

Various speech recognition systems have been proposed herebefore to recognize isolated utterances by comparing an unknown isolated audio signal, suitably processed, with one or more previously prepared representations of known keywords. In this context, "keywords" is used to mean a connected group of phonemes and sounds and may be, for example, a portion of a syllable, a word, a phrase, etc. While many systems have met with limited success, one system, in particular, has been employed successfully, in commercial applications, to recognize isolated keywords. This system operates substantially in accordance with the method described in U.S. Pat. No. 4,038,503, granted July 26, 1977, assigned to the assignee of this application, and provides a successful method for recognizing one of a restricted vocabulary of keywords provided that the boundaries of the unknown audio signal data are either silence or background noise as measured by the recognition system. That system relies upon the presumption that the interval, during which the unknown audio signal occurs, is well defined and contains a single keyword utterance.

In a continuous audio signal, such as continuous conversational speech, wherein the keyword boundaries are not a priori known or marked, several methods have been devised to segment the incoming audio data, that is, to determine the boundaries of linguistic units, such as phonemes, syllables, words, sentences, etc., prior to initiation of a keyword recognition process. These prior continuous speech systems, however, have achieved only a limited success in part because a satisfactory segmenting process has not been found. Other substantial problems still exist: for example, only limited vocabularies can be consistently recognized with a low false alarm rate; the recognition accuracy is highly sensitive to the differences between voice characteristics of different talkers; and the systems are highly sensitive to distortion in the audio signals being analyzed, such as typically occurs, for example, in audio signals transmitted over ordinary telephone communications apparatus.

The continuous speech recognition methods described in U.S. applications Ser. Nos. 901,001; 901,005; and 901,006, all filed Apr. 27, 1978, and now U.S. Pat. Nos. 4,227,176; 4,241,329; and 4,227,177, respectively, describe commercially acceptable and effective procedures for successfully recognizing, in real time, keywords in continuous speech. The general methods described in these patents are presently in commercial use and have been proved both experimentally and in practical field testing to effectively provide a high reliability and low error rate, in a speaker-independent environment. Nevertheless, even these systems, while at the forefront of present day technology, and the concept upon which they were developed, have shortcomings in both the false-alarm rate and speaker-independent performance.

The continuous speech recognition methods described in the above-identified U.S. patents are directed primarily to recognizing or spotting one of a plurality of keywords in continuous speech. In other applications, a continuous word string can be recognized wherein the result of the recognition process is the identity of each of the individual word elements of the continuous word string. A continuous word string in this context is a plurality of recognizable elements which are bounded by silence. This is related for example to the commercial equipment noted above with respect to the isolated word application in which the boundaries are a priori known. Here however the boundaries, silence, are unknown and must be determined by the recognition system itself. In addition, the elements being examined are no longer keyword elements but a plurality of elements "strung" together to form the word string. Various methods and apparatus have been suggested in the art for recognizing continuous word strings. These apparatus and methods however have various shortcomings again, for example, in false alarm rate, speaker independent performance, and real time operation.

Therefore, a principal object of the present invention is a speech recognition method and apparatus having improved effectiveness in recognizing continuous word strings in a continuous, unmarked audio signal. Other objects of the invention are a method and apparatus which are relatively insensitive to phase and amplitude distortion of the unknown audio input signal data, which are relatively insensitive to variations in the articulation rate of the unknown audio input signals, which will respond equally well to different speakers and hence different voice characteristics, which are reliable and have an improved lower false-alarm rate, and which will operate in real time.

SUMMARY OF THE INVENTION

The invention relates to a method and apparatus for analyzing audio signals. Specifically, the audio signal is a speech signal and the method and apparatus recognize keywords in the speech. Each keyword is characterized by a keyword template having at least one target pattern. Each target pattern represents at least one short term power spectrum and each pattern further has associated with it at least two required dwell time positions followed by at least one optional dwell time position. In general, each target pattern will have a plurality of required and optional dwell time positions. Thus, the dwell time positions define the limits of the time interval during which a given target pattern can be said to match an incoming multi-frame pattern.

The recognition method features the steps of forming, at a repetitive frame time, a sequence of frame patterns from, and representing, the audio signal. Each frame pattern thus will correspond for a keyword to a respective target pattern at a dwell time position. Numerical measures of the similarity of each frame pattern with each target pattern are then generated. The method further features the steps of accumulating, for each of the target pattern required and optional dwell time positions, using the nunerical measures, a numerical value representing the alignment of the just formed audio representing frame pattern with the respective target pattern dwell time positions and generating a recognition decision based upon the numerical values when a predetermined event occurs in the audio signal. Each generated numerical measure, corresponding to a frame pattern, is forced to contribute to the word score of the keywords being recognized. Preferably, the predetermined event is the recognition of "silence".

In another aspect, the accumulation step features the steps of (1) accumulating for each target pattern second and later dwell position the sum of the accumulated score for the previous target pattern dwell time position during the previous frame time and the present numerical measure associated with the target pattern; (2) accumulating, for each keyword first target pattern, first required dwell time position, the sum of the best accumulated score during the previous frame time which is associated with the end of a keyword, and the present numerical measure associated with the keyword first target pattern; and (3) accumulating for each other target pattern first dwell position the sum of the best ending accumulated value for the previous target pattern of the same keyword and the present numerical measure associated with the target pattern.

The method further features the steps of storing, in association with each frame time position, the identity and duration, in frame time positions, of the keyword having the best score and a valid ending at the frame time position, and storing in association with each dwell time position accumulated score, a word duration count corresponding to the time position length of the keyword associated with the accumulated score at that dwell time position. Thereby, the generating step further includes the step of tracing back, through the stored keyword identity and duration information, for determining each keyword in a word string.

In yet another aspect, the method further features storing, in association with each accumulated score corresponding to the dwell time positions, a keyword duration count. The duration count corresponds to the number of numerical measures, that is, the time position count, which have been accumulated to form that position score for the present keyword pattern. In another aspect, the method further features directing the transfer of the accumulated scores in response to a syntax controlled element.

The apparatus of the invention can be accommodated in either hardware, software, or a mixture of the two. Hardware employed for implementing the method of the invention is described in further detail hereinafter.

BRIEF DESCRIPTION OF THE DRAWINGS

Other objects, features, and advantages of the invention will appear from the following description of a preferred embodiment taken together with the drawings in which:

FIG. 7 is an electrical circuit diagram of an overflow detection logic circuit according to a preferred embodiment of the invention;

FIG. 8 is a truth table for the circuit diagram of FIG. 7;

Corresponding reference characters indicate corresponding elements throughout the several views of the drawings.

DESCRIPTION OF A PREFERRED EMBODIMENT

In one of the particular preferred embodiments which is described herein, speech recognition is performed by an overall apparatus which involves both a specially constructed electronic system for effecting certain analog and digital processing of incoming audio data signals, generally speech, and a general purpose digital computer which is programmed in accordance with the present invention to effect certain other data reduction steps and numerical evaluations. The division of tasks between the hardware portion and the software portion of this system has been made so as to obtain an overall system which can accomplish speech recognition in real time at moderate cost. However, it should be understood that some of the tasks being performed in hardware in this particular system could well be performed in software and that some of the tasks being performed by software programming in this example might also be performed by special purpose circuitry in a different embodiment of the invention. In this later connection, where available, hardware and software implementations of the apparatus will be described.

Figure 1:
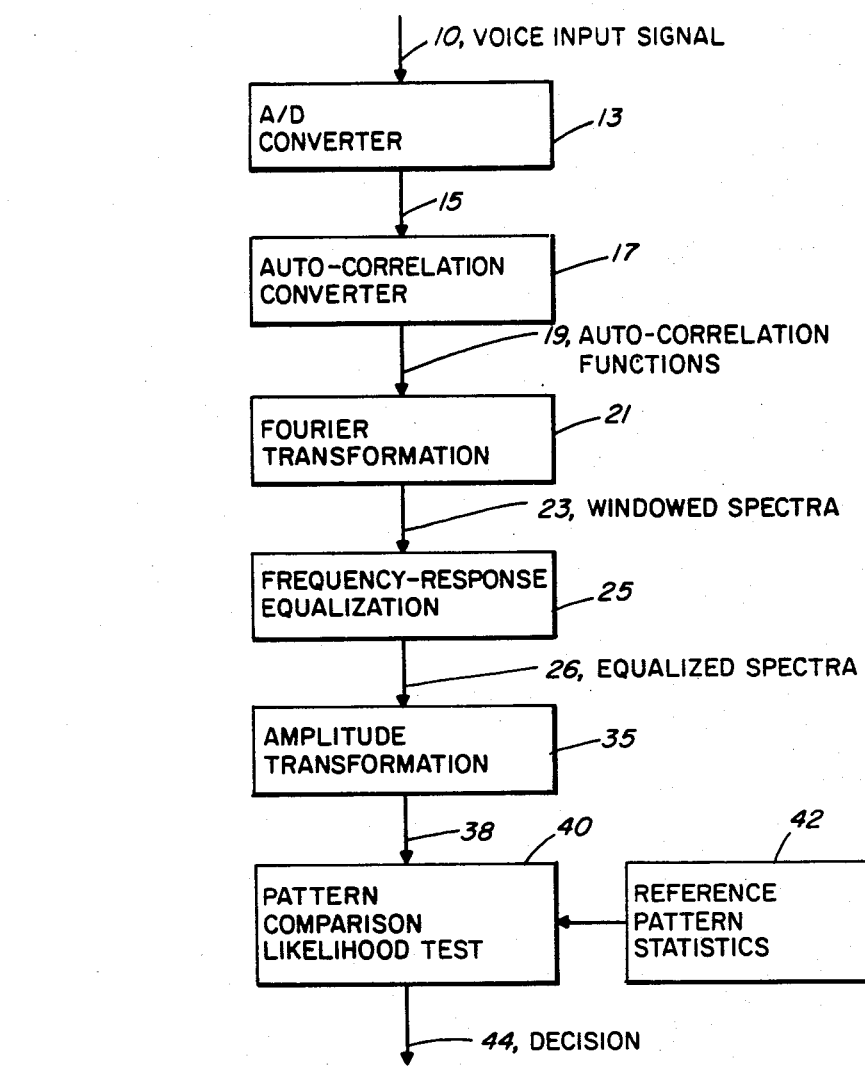
FIG. 1 is a flow chart illustrating in general terms the sequence of operations performed in accordance with the practice of the present invention.

One aspect of the present invention is the provision of apparatus which will recognize a word string in continuous speech signals even though those signals are distorted, for example, by a telephone line. Thus, referring in particular to FIG. 1, the voice input signal, indicated at 10, may be considered a voice signal produced by a carbon element telephone transmitter and receiver over a telephone line encompassing any arbitrary distance or number of switching interchanges. A typical application of the invention is therefore recognizing continuous word strings in audio data from an unknown source received over the telephone system. On the other hand, the input signal may also be any audio data signal, for example, a voice input signal, taken from a radio telecommunications link, for example, from a commercial broadcast station, from a private dedicated communications link, or an operator standing near the equipment.

As will become apparent from the description, the present method and apparatus are concerned with the recognition of speech signals containing a sequence of sounds or phonemes, or other recognizable indicia. In the description herein, and in the claims, reference is made to either "a word," "an element", "a sequence of target patterns," "a template pattern," or "an element template," the five terms being considered as generic and equivalent. This is a convenient way of expressing a recognizable sequence of audio sounds, or representations thereof, which combine to constitute the word string which the method and apparatus can detect and recognize. The terms should be broadly and generically construed to encompass anything from a single phoneme, syllable, or sound, to a series of words (in the grammatical sense) as well as a single word.

An analog-to-digital (A/D) converter 13 receives the incoming analog audio signal data on line 10 and converts the signal amplitude of the incoming data to a digital form. The illustrated A/D converter is designed to convert the input signal data to a twelve-bit binary representation, the conversions occurring at the rate of 8,000 conversions per second. (In other embodiments, other sampling rates can be employed; for example, a 16 kHz rate can be used when a high quality signal is available.) The A/D converter 13 applies its output over lines 15 to an autocorrelator 17. The autocorrelator 17 processes the digital input signals to generate a short-term autocorrelation function one hundred times per second and applies its output, as indicated, over lines 19. Each autocorrelation function has thirty-two values or channels, each value being calculated to a 30-bit resolution. The autocorrelator is described in greater detail hereinafter with reference to FIG. 2.

The autocorrelation functions over lines 19 are Fourier transformed by a Fourier transformation apparatus 21 to obtain corresponding short-term windowed power spectra over lines 23. The spectra are generated at the same repetition rate as the autocorrelation functions, that is, 100 per second, and each short-term power spectrum has thirty-one numerical terms having a resolution of 16 bits each. As will be understood, each of the thirty-one terms in the spectrum represents the signal power within a frequency band. The Fourier transformation apparatus also preferably includes a Hamming or similar window function to reduce spurious adjacent-band responses.

Figure 3:
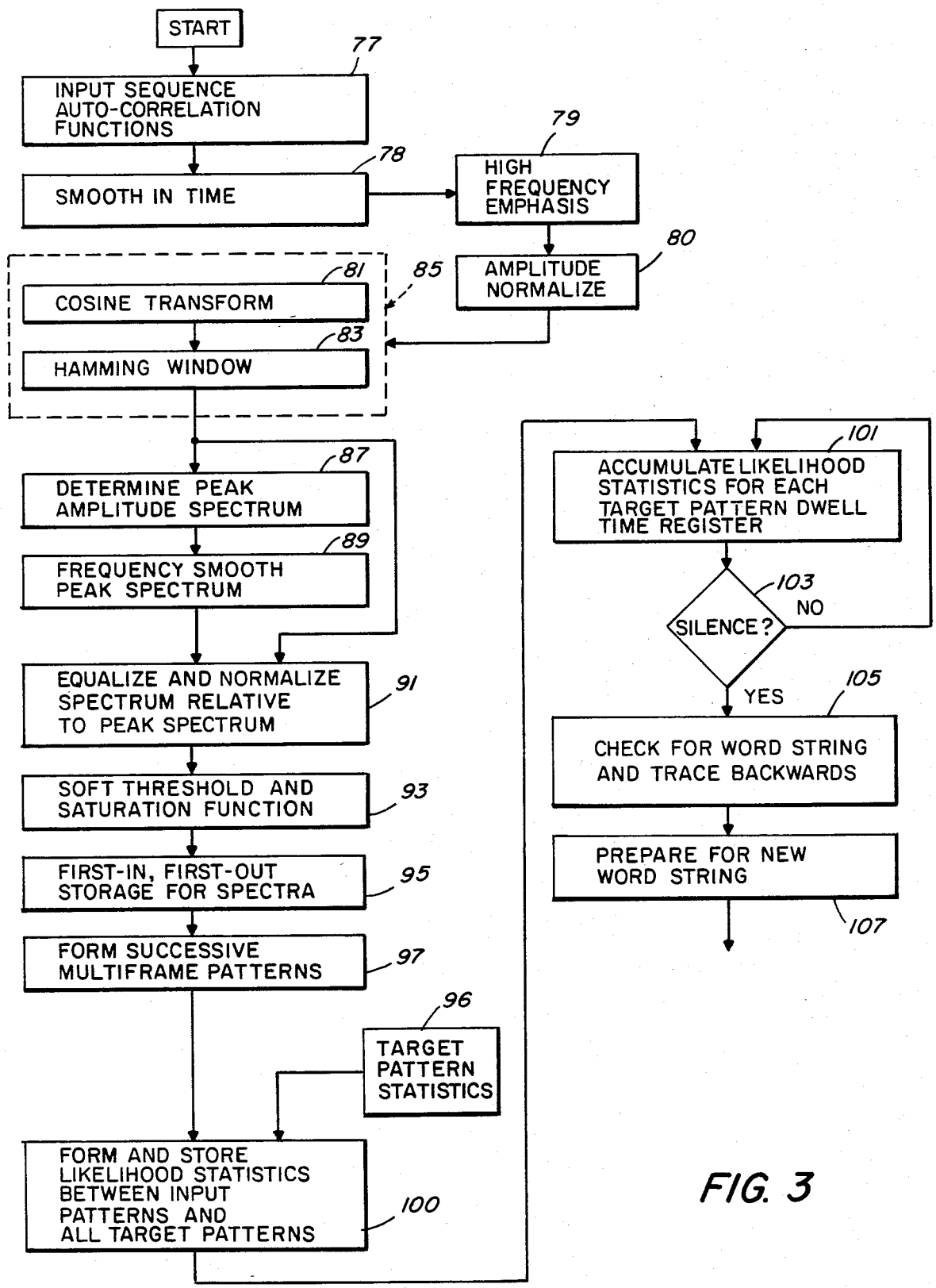
FIG. 3 is a flow diagram of a digital computer program performing certain procedures in the process of FIG. 1.

In the first illustrated embodiment, the Fourier transformation as well as subsequent processing steps are preferably performed under the control of a general purpose digital computer, appropriately programmed, utilizing a peripheral array processor for speeding the arithmetic operations required repetitively according to the present method. The particular computer employed is a model PDP-11 manufactured by the Digital Equipment Corporation of Maynard, Mass. The particular array processor employed is described in U.S. Pat. No. 4,228,498, assigned to the assignee of this application. The programming described hereinafter with reference to FIG. 3 is substantially predicated upon the capabilities and characteristics of these available digital processing units.

The short-term windowed power spectra are frequency-response equalized, as indicated at 25, equalization being performed as a function of the peak amplitudes occurring in each frequency band or channel as described in greater detail hereinafter. The frequency-response equalized spectra, over lines 26, are generated at the rate of one hundred per second and each spectrum has thirty-one numerical terms evaluated to 16 bit accuracy. To facilitate the final evaluation of the incoming audio data, the frequency-response equalized and windowed spectra over lines 26 are subjected to an amplitude transformation, as indicated at 35, which imposes a non-linear amplitude transformation on the incoming spectra. This transformation is described in greater detail hereinafter, but it may be noted at this point that it improves the accuracy with which the unknown incoming audio signal may be matched with target pattern templates in a reference vocabulary. In the illustrated embodiment, this transformation is performed on all of the frequency-response equalized and windowed spectra at a time prior to the comparison of the spectra with patterns representing the elements of the reference vocabulary.

The amplitude transformed and equalized short-term spectra over lines 38 are then compared against the element templates at 40 as described in detail below. The reference patterns, designated at 42, represent the elements of the reference vocabulary in a statistical fashion with which the transformed and equalized spectra can be compared. Each time "silence" is detected, a decision is made with regard to the identity of the just received word string. This is indicated at 44. Candidate words are thus selected according to the closeness of the comparison; and in the illustrated embodiment, the selection process is designed to minimize the likelihood of a missed keyword.

Figure 1A:
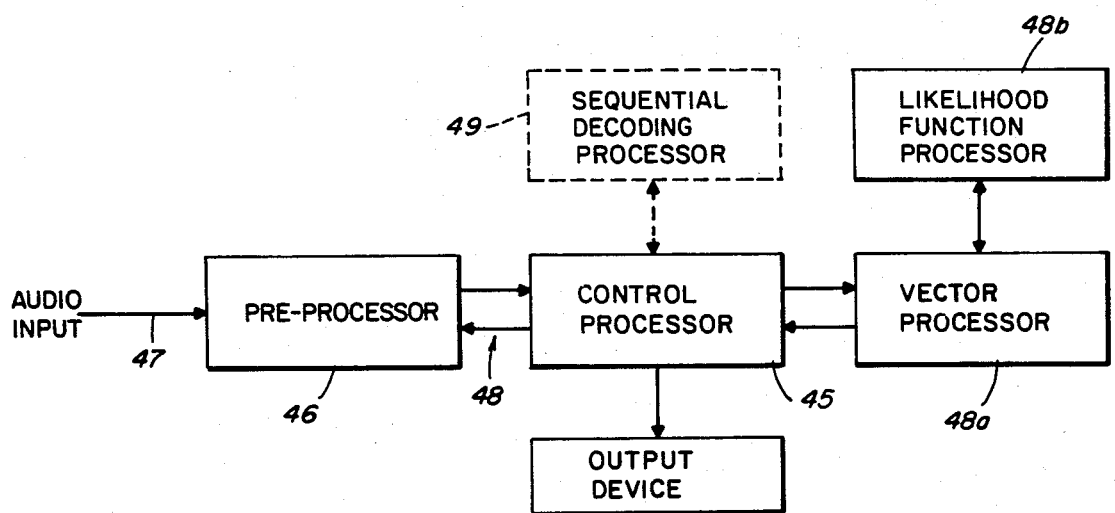
FIG. 1A is an electrical block diagram of apparatus according to a preferred embodiment of the invention.

Referring to FIG. 1A, a speech recognition system, according to the invention, employs a controller 45 which may be for example a general purpose digital computer such as a PDP-11 or a hardware controller specifically built for the apparatus. In the illustrated embodiment, the controller 45 receives preprocessed audio data from a preprocessor 46 which is described in greater detail in connection with FIG. 2. The preprocessor 46 receives audio input analog signals over a line 47 and provides processed data over interface lines 48 to the control processor.

Generally, the operational speed of the control processor, if a general purpose element, is not fast enough to process the incoming data in real time. As a result, various special purpose hardware can be advantageously employed to effectively increase the processing speed of element 45. In particular, a vector processing element 48a such as that described in U.S. Pat. No. 4,228,498, assigned to the assignee of this invention, provides significantly increased array processing capability by using a pipeline effect. In addition, as described in more detail in connection with FIGS. 4, 5, and 6, a likelihood function processor 48b can be used in connection with the Vector Processor in order to still further increase the operating speed of the apparatus by tenfold.

While in the preferred embodiment of the invention control processor 45 is a digital computer, in another particular embodiment, described in connection with FIG. 10, a significant portion of the processing capability is implemented externally of the control processor in a sequential decoding processor 49. The structure of this processor is described in greater detail in connection with FIG. 10. Thus, the apparatus for implementing speech recognition illustrated herein has great flexibility both in its speed capabilities and in the ability to be implemented it in both hardware, software, or an advantageous combination of hardware and software elements.

Preprocessor

Figure 2:
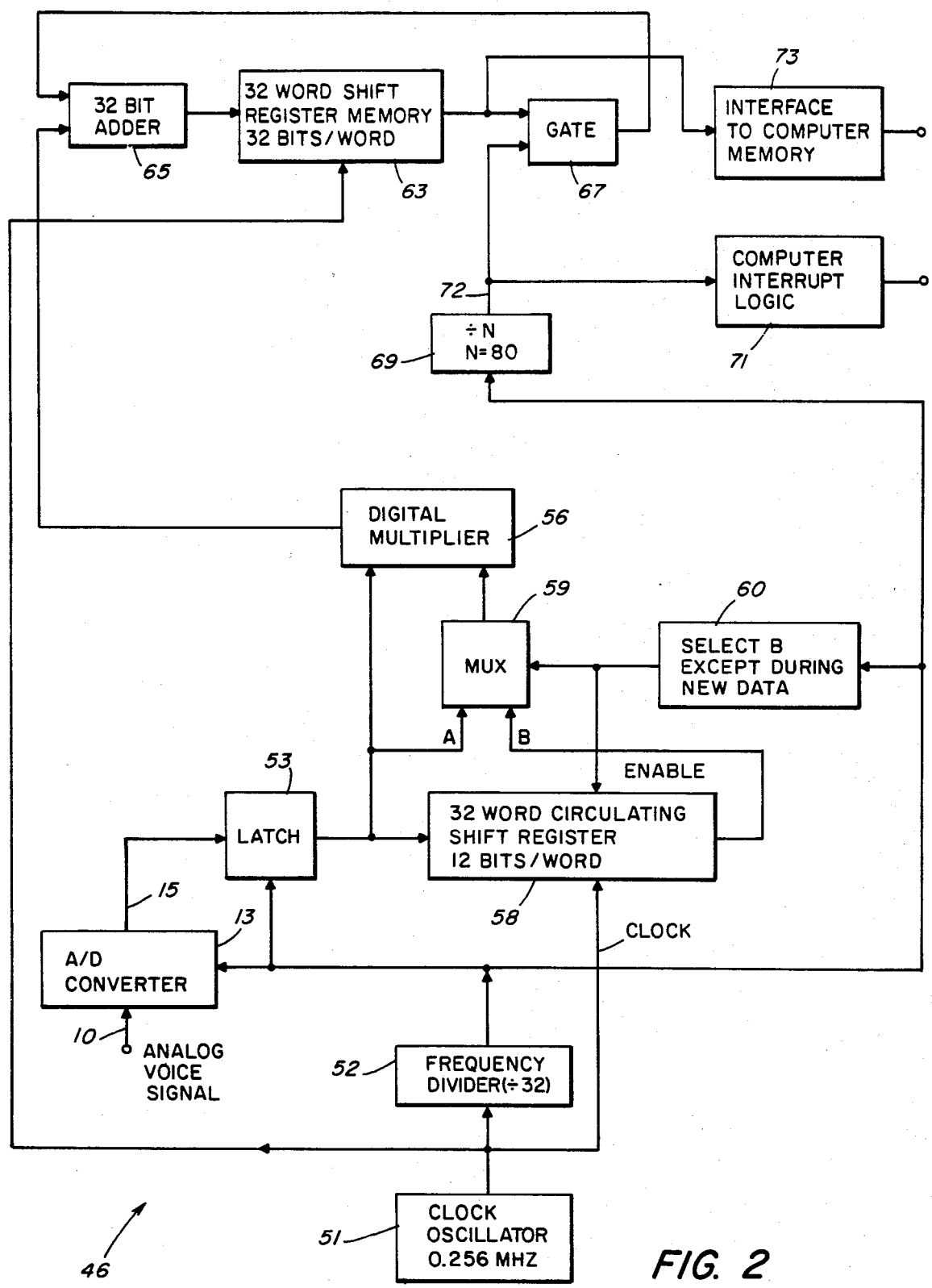
FIG. 2 is a schematic block diagram of electronic apparatus for performing certain preprocessing operations in the overall process illustrated in FIG. 1.

In the apparatus illustrated in FIG. 2, an autocorrelation function with its instrinsic averaging is performed digitally on the digital data stream generated by the analog-to-digital converter 13 operating on the incoming analog audio data over line 10, generally a voice signal. The converter 13 provides a digital input signal over lines 15. The digital processing functions, as well as the input analog-to-digital conversion, are timed under the control of a clock oscillator 51. The clock oscillator provides a basic timing signal of 256,000 pulses per second, and this signal is applied to a frequency divider 52 to obtain a second timing signal at 8,000 pulses per second. The slower timing signal controls the analog-to-digital converter 13 together with a latch register 53 which holds the twelve-bit results of the last conversion until the next conversion is completed.

The autocorrelation products are generated by a digital multiplier 56 which multiplies the number contained in register 53 by the output of a thirty-two word shift register 58. Shift register 58 is operated in a recirculating mode and is driven by the faster clock frequency, so that one complete circulation of the shift register data is accomplished for each analog-to-digital conversion. An input to shift register 58 is taken from register 53 once during each complete circulation cycle. One input to the digital multiplier 56 is taken directly from the latch register 53 while the other input to the multiplier is taken (with one exception described below) from the current output of the shift register through a multiplexer 59. The multiplications are performed at the higher clock frequency.

Thus, each value obtained from the A/D conversion is multiplied with each of the preceding 31 conversion values. As will be understood by those skilled in the art, the signals thereby generated are equivalent to multiplying the input signal by itself, delayed in time by thirty-two different time increments (one of which is the zero delay). To produce the zero delay correlation, that is, the power of the signal, multiplexer 59 causes the current value of the latch register 53 to be multiplied by itself at the time each new value is being introduced into the shift register. This timing function is indicated at 60.

As will also be understood by those skilled in the art, the products from a single conversion, together with its 31 predecessors, will not be fairly representative of the energy distribution or spectrum over a reasonable sampling interval. Accordingly, the apparatus of FIG. 2 provides for averaging of these sets of products.

An accumulation process, which effects averaging, is provided by a thirty-two word shift register 63 which is interconnected with an adder 65 to form a set of thirty-two accumulators. Thus, each word can be recirculated after having been added to the corresponding increment from the digital multiplier. The circulation loop passes through a gate 67 which is controlled by a divide-by-N divider circuit 69 driven by the low frequency clock signal. The divider 69 divides the lower frequency clock by a factor which determines the number of instantaneous autocorrelation functions which are accumulated, and thus averaged, before the shift register 63 is read out.

In the illustrated example, eighty samples are accumulated before being read out. In other words, N for the divide-by-N divider circuit 69 is equal to eighty. After eighty conversion samples have thus been correlated and accumulated, the divider circuit 69 triggers a computer interrupt circuit 71 over a line 72. At this time, the contents of the shift register 63 are successively read into the computer memory through a suitable interface circuitry 73, the thirty-two successive words in the register being presented in ordered sequence to the computer through the interface 73. As will be understood by those skilled in the art, this data transfer from a peripheral unit, the autocorrelator preprocessor, to the computer may be typically performed by a direct memory access procedure. Predicated on an averaging of eighty samples, at an initial sampling rate of 8,000 samples per second, it will be seen that 100 averaged autocorrelation functions are provided to the computer every second.

While the shift register contents are being read out to the computer, the gate 67 is closed so that each of the words in the shift register is effectively reset to zero to permit the accumulation process to begin again.

Expressed in mathematical terms, the operation of the apparatus shown in FIG. 2 can be described as follows. Assuming that the analog-to-digital converter generates the time series $S(t)$, where $t=0, T_o, 2T_o, \ldots$, and $T_o$ is the sampling interval (1/8000 sec. in the illustrated embodiment), the illustrated digital correlation circuitry of FIG. 2 may be considered, ignoring start-up ambiguities, to compute the autocorrelation function $$a(j, t) = \sum_{k=0}^{79} S(t + kT_o) S(t + (k - j) T_o) \qquad (1)$$

where $j=0, 1, 2 \ldots, 31$; and $t=80 T_o, 160 T_o, \ldots, 80n T_o, \ldots$. These autocorrelation functions correspond to the correlation output on lines 19 of FIG. 1.

Referring now to FIG. 3, the digital correlator operates continuously to transmit to the computer a series of data blocks at the rate of one complete autocorrelation function every ten milliseconds. This is indicated at 77 (FIG. 3). Each block of data represents the autocorrelation function derived from a corresponding subinterval of time. As noted above, the illustrated autocorrelation functions are provided to the computer at the rate of one hundred, 32-word functions per second. This analysis interval is referred to hereinafter as a "frame".

In the first illustrated embodiment, the processing of the autocorrelation function data is performed by an appropriately programmed, special purpose digital computer. The flow chart, which includes the function provided by the computer program is given in FIG. 3. Again, however, it should be pointed out that various of the steps could also be performed by hardware (as described below) rather than software and that likewise certain of the functions performed by apparatus of FIG. 2 could additionally be performed in software by a corresponding revision of the flow chart of FIG. 3.

Although the digital correlator of FIG. 2 performs some time-averaging of the autocorrelation functions generated on an instantaneous basis, the average autocorrelation functions read out to the computer may still contain some anomalous discontinuities or unevenness which might interfere with the orderly processing and evaluation of the samples. Accordingly, each block of data, that is, each autocorrelation function $a(j,t)$ is first smoothed with respect to time. This is indicated in the flow chart of FIG. 3 at 78. The preferred smoothing process is one in which the smoothed autocorrelation output $a_s(j,t)$ is given by $$a_s(j, t) = C_o a(j,t) + C_1 a(j, t-T) + C_2 a(j, t-2T) \quad (2)$$

where $a(j,t)$ is the unsmoothed input autocorrelation defined in Equation 1, $a_s(j,t)$ is the smoothed autocorrelation output, j denotes the delay time, t denotes real time, and T denotes the time interval between consecutively generated autocorrelation functions (frames), equal to 0.01 second in the preferred embodiment. The weighting functions $C_o$, $C_1$, $C_2$, are preferably chosen to be $\frac{1}{4}, \frac{1}{2}, \frac{1}{4}$ in the illustrated embodiment, although other values could be chosen. For example, a smoothing function approximating a Gaussian impulse response with a frequency cutoff of, say, 20 Hertz could have been implemented in the computer software. However, experiments indicate that the illustrated, easier to implement, smoothing function of Equation 2 provides satisfactory results. As indicated, the smoothing function is applied separately for each value j of delay.

It will become clear that subsequent analysis involves various operations on the short-term Fourier power spectrum of the speech signal and for reasons of hardware simplicity and processing speed, the transformation of the autocorrelation function to the frequency domain is carried out in eight-bit arithmetic in the illustrated embodiment. At the high end of the band pass, near three kilohertz, the spectral power density decreases to a level at which resolution is inadequate in eight-bit quantities. Therefore, the frequency response of the system is tilted at a rising rate of 6 db per octave. This is indicated at 79. This high frequency emphasis is accomplished by taking the second derivative of the autocorrelation function with respect to its argument, i.e., the time delay or lag. The derivative operation is $$b(j,t) = -a(j+1, t) + 2a(j,t) - a(j-1, t) \quad (3)$$

To evaluate the derivative for $j=0$, it is assumed that the autocorrelation function is symmetrical about 0, so that $a(-j,t) = a(+j,t)$. Also, there is no data for $a(32)$ so the derivative at $j=31$ is taken to be the same as the derivative when $j=30$.

As indicated in the flow chart of FIG. 3, the next step in the analysis procedure, after high frequency emphasis, is to estimate the signal power in the current frame interval by finding the peak absolute value of the autocorrelation. The power estimate, $P(t)$, is $$P(t) = \max_i |b(i,t)| \quad (4)$$

In order to prepare the autocorrelation for the eight-bit spectrum analysis, the smoothed autocorrelation function is block normalized with respect to $P(t)$ (at 80) and the most significant eight bits of each normalized value are input to the spectrum analysis hardware. The normalized (and smoothed) autocorrelation function is, therefore:

$$c(j,t) = 127 \, b(j,t)/P(t). \quad (5)$$

As indicated at 81, a cosine Fourier transform is then applied to each time smoothed, frequency emphasized, normalized autocorrelation function, $c(j,t)$, to generate a 31 point power spectrum. The matrix of cosine values is given by:

$$S(i,j) = 126 \, g(i) \, (\cos (2\pi i/8000)f(j)), j = 0, 1, 2, \ldots, 31 \quad (6)$$

where $S(i,j)$ is the spectral energy in a band centered at $f(j)$ Hz, at time t; $g(i) = \frac{1}{2}(1 + \cos 2\pi i/63)$ is the (Hamming) window function envelope to reduce side lobes; and $$f(j) = 30 + 1000 \, (0.0552j + 0.438)^{1/0.63} \text{ Hz}; j = 0, 1, 2, \ldots, 31 \quad (7)$$

which are the analysis frequencies equally spaced on the so-called "mel" curve of subjective musical pitch. As will be understood, this corresponds to a subjective pitch (mel scale) frequency-axis spacing for frequencies in the bandwidth of a typical communication channel of about 300–3500 Hertz.

Since the spectrum analysis requires summation over lags from $-31$ to $+31$, by making the assumption that the autocorrelation is symmetric about zero, only the positive values of j are required. However, to avoid counting the lag zero term twice, the cosign matrix is adjusted so that $$S(0,j) = 126/2 = 63, \text{ for all } j \quad (8)$$

Thus the computed power spectrum is given by $$S'(j,t) = \left| \sum_{i=0}^{31} a(i,t) \, S(i,j) \right|, j = 0, 1, \ldots, 31 \quad (9)$$

where the jth result corresponds to the frequency $f(j)$.

As will also be understood, each point or value within each spectrum represents a corresponding band of frequencies. While this Fourier transform can be performed completely within the conventional computer hardware, the process may be speeded considerably if an external hardware multiplier or Fast Fourier Transform (FFT) peripheral device is utilized. The construction and operation of such modules are well known in the art, however, and are not described in detail herein. Advantageously built into the hardware Fast Fourier Transform peripheral device is the frequency smoothing function wherein each of the spectra are smoothed in frequency according to the preferred (Hamming) window weighting function $g(i)$ defined above. This is indicated at 83 of the block 85 which corresponds to the hardware Fourier transform implementation.

If the background noise is significant, an estimate of the power spectrum of the background noise should be subtracted from $S'(j,t)$ at this stage. The frame or frames selected to represent the noise should not contain any speech signals. The optimum rule for selecting noise frame intervals will vary with the application. If the talker is engaged in two-way communication, for example, with a machine controlled by the speech recognition apparatus, it is convenient, for example, to chose a frame arbitrarily in the interval immediately after the machine has finished speaking by its voice response unit. In less constrained situations, the noise frame may be found by choosing a frame of a minimum amplitude during the past one or two seconds of audio input.

As successive smoothed power spectra are received from the Fast Fourier Transform peripheral 85, a communications channel equalization is obtained by determining a (generally different) peak power spectrum envelope for the spectra from peripheral 85, and modifying the output of the Fast Fourier Transform apparatus accordingly, as described below. Each newly generated peak amplitude spectrum p (j, t), corresponding to and updated by an incoming windowed power spectrum S'(j, t), where j is indexed over the plural frequency bands of the spectrum, is the result of a fast attack, slow decay, peak detecting function for each of the spectrum channels or bands. The windowed power spectra are normalized with respect to the respective terms of the corresponding peak amplitude spectrum. This is indicated at 87.

According to the illustrated embodiment, the values of the "old" peak amplitude spectrum $p(j, t-T)$, determined prior to receiving a new windowed spectrum are compared on a frequency band by frequency band basis with the new incoming spectrum S'(j, t). The new peak spectrum p(j,t) is then generated according to the following rules. The power amplitude in each band of the "old" peak amplitude spectrum is multiplied by a fixed fraction, for example, 1023/1024, in the illustrated example. This corresponds to the slow decay portion of the peak detecting function. If the power amplitude in a frequency band j of the incoming spectrum S'(j,t) is greater than the power amplitude in the corresponding frequency band of the decayed peak amplitude spectrum, then the decayed peak amplitude spectrum value for that (those) frequency band(s) is (are) replaced by the spectrum value of the corresponding band of the incoming windowed spectrum. This corresponds to the fast attack portion of the peak detecting function. Mathematically, the peak detecting function can be expressed as $$p(j,t) = \max\{p(j,t-T)\cdot(1-E);\ P(t)\cdot S'(j,t)\} j = 0, 1, \ldots, 31 \quad (10)$$

where j is indexed over each of the frequency bands, p(j,t) is the resulting peak spectrum, $p(j, t-T)$ is the "old" or previous peak spectrum, S'(j,t) is the new incoming, partially processed, power spectrum, P(t) is the power estimate at time t, and E is the decay parameter.

According to equation 10, the peak spectrum normally decays, absent a higher value spectrum input, by a factor of $1-E$. Typically E equals 1/1024. It may however be undesirable to permit decay of the peak spectrum during intervals of silence, particularly if no rapid change in the communication channel or voice characteristics is expected. To define the silence frame, the same method employed to choose background noise frames can be employed The amplitudes (square root of P(t)) of the past 128 frames are inspected, and the minimum value found. If the amplitude of the current frame is less than four times this minimum, the current frame is determined to be silence and the value "zero" is substituted for the value 1/1024, for E.

After the peak spectrum is generated the resulting peak amplitude spectrum p(j,t) is frequency smoothed at 89 by averaging each frequency band peak value with peak values corresponding to adjacent frequencies of the newly generated peak spectra, the width of the overall band of frequencies contributing to the average value being approximately equal to the typical frequency separation between formant frequencies. As will be understood by those skilled in the speech recognition art, this separation is in the order of about 1000 Hz. By averaging in this particular way, the useful information in the spectra, that is, the local variations revealing formant resonances are retained whereas overall or gross emphasis in the frequency spectrum is suppressed. According to the preferred embodiment the peak spectrum is smoothed with respect to frequency by a moving average function covering seven adjacent frequency bands. The averaging function is:

$$e(j,t) = h(j) \sum_{k=j-3}^{j+3} p(k,t) \quad (11)$$

At the ends of the passband, p(k,t) is taken to be 0, for k less than 0 and k greater than 31. The normalizing envelope h(j) takes into account the number of valid data elements actually summed: thus, $h(0)=7/4$, $h(1)=7/5$, $h(2)=7/6$, $h(3)=1$, . . . , $h(28)=1$, $h(29)=7/6$, $h(30)=7/5$, and $h(31)=7/4$. The resulting smoothed peak amplitude spectrum e(j,t) is then employed to normalize and frequency equalize the just received power spectrum, S'(j,t), by dividing the amplitude value of each frequency band of the incoming smoothed spectrum S'(j,t), by the corresponding frequency band value in the smoothed speak spectrum e(j,t). Mathematically, this corresponds to $$s_n(j,t) = (S'(j,t)/e(j,t))\ 32767 \quad (12)$$

where $s_n(f,t)$ is the peak-normalized, smoothed power spectrum and j is indexed over each of the frequency bands. This step is indicated at 91. There results a sequence of frequency equalized and normalized short-term power spectra which emphasizes changes in the frequency content of the incoming audio signals while suppressing any generalized long-term frequency emphasis or distortion. This method of frequency compensation has been found to be highly advantageous in the recognition of speech signals transmitted over frequency distorting communication links such as telephone lines, in comparison to the more usual systems of frequency compensation in which the basis for compensation is the average power level, either in the whole signal or in each respective frequency band.

It is useful to point out that, while successive spectra have been variously processed and equalized, the data representing the incoming audio signals still comprises spectra occurring at a rate of one hundred per second.

The normalized and frequency equalized spectra, indicated at 91, are subjected to an amplitude transformation, indicated at 93, which effects a non-linear scaling of the spectrum amplitude values. Designating the individual equalized and normalized spectra as $s_n(j,t)$ (from Equation 12) where j indexes the different frequency bands of the spectrum and t denotes real time, the non-linear scaled spectrum x(j,t) is defined by the linear fraction function $$x(j,t) = 128\ \frac{s_n(j,t) - A}{s_n(j,t) + A}\ j = 0, 1, \ldots, 30 \quad (13)$$

where A is the average value of the spectrum $s_n(j,t)$ over $j=0$ to 31, and is defined as follows:

$$A = \frac{1}{32} \sum_{j=0}^{31} s_n(j,t) \quad (14)$$

where j indexes over the frequency bands of the power spectrum.

The thirty-first term of the spectrum is replaced by the logarithm of A so that $$x(31,t) = 16\ \log_2 A \quad (15)$$

This scaling function (Eq. 13) produces a soft threshold and gradual saturation effect for spectral intensities which deviate greatly from the short-term average A. Mathematically, for intensities near the average, the function is approximately linear; for intensities further from the average, it is approximately logarithmic; and at the extreme values of intensity, it is substantially constant. On a logarithmic scale, the function $x(j,t)$ is symmetric about zero and the function exhibits threshold and saturation behavior that is suggestive of an auditory nerve firing-rate function. In practice, the overall recognition system performs significantly better with this particular non-linear scaling function than it does with either a linear or a logarithmic scaling of the spectrum amplitudes.

There is thus generated a sequence of amplitude transformed, frequency-response equalized, normalized, short-term power spectra $x(j,t)$ where t equals 0.01, 0.02, 0.03, 0.04, ..., seconds and $j=0, ..., 30$ (corresponding to the frequency bands of the generated power spectra). Thirty-two words are provided for each spectrum; and the value of A (Equation 15), the average value of the spectrum values, is stored as the thirty-second word. The amplitude transformed, short-term power spectra hereinafter referred to as "frames", are stored, as indicated at 95, in a first-in, first-out circulating memory having storage capacity, in the illustrated embodiment, for 256 thirty-two-word spectra. There is thus made available for analysis, in the illustrated embodiment, 2.56 seconds of the audio input signal. This storage capacity provides the recognition system with the flexibility, if required, to select spectra at different real times, for analysis and evaluation and thus with the ability to go forward and backward in time as the analysis requires.

Thus, the frames for the last 2.56 seconds are stored in the circulating memory and are available as needed. In operation, in the illustrated embodiment, each frame is stored for 2.56 seconds. Thus, a frame, which enters the circulating memory at time $t_1$, is lost or shifted from the memory 2.56 seconds later as a new frame, corresponding to a time $t_1 + 2.56$, is stored.

The frames passing through the circulatory memory are compared, preferably in real time, against a known vocabulary of words to determine and identify the input data in word groups called a word string. Each vocabulary word is represented by a template pattern statistically representing a plurality of processed power spectra formed into plural non-overlapping multiframe (preferably three frames) design set patterns. These patterns are preferably selected to best represent significant acoustical events of the vocabulary words and are stored at 94.

The spectra forming the design set patterns are generated for the words spoken in various contexts using the same system described hereinabove for processing the continuous unknown speech input on line 10 as shown in FIG. 3.

Thus, each vocabulary word has associated with it a generally plural sequence of design set patterns, $P(i)_1, P(i)_2, ...$, which represent, in a domain of short-term power spectra, one designation of that ith keyword. The collection of design set patterns for each keyword form the statistical basis from which the target patterns are generated.

In the illustrated embodiment of the invention, the design set patterns $P(i)_j$ can each be considered a 96 element array comprising three selected frames arranged in a series sequence. The frames forming the pattern should preferably be spaced at least 30 milliseconds apart to avoid spurious correlation due to time domain smoothing. In other embodiments of the invention, other sampling strategies can be implemented for choosing the frames; however, the preferred strategy is to select frames spaced by a constant time duration, preferably 30 milliseconds, and to space the non-overlapping design set patterns throughout the time interval defining the keyword. Thus, a first design set pattern $P_1$ corresponds to a portion of a keyword near its beginning, a second pattern $P_2$ corresponds to a portion later in time, etc., and the patterns $P_1, P_2, ...$ form the statistical basis for the series or sequence of target patterns, the word template, against which the incoming audio data will be matched. The target patterns $t_1, t_2, ...$, each comprise the statistical data, generated from corresponding $P(i)_j$ by assuming the $P(i)_j$ are comprised of independent Gaussian variables, which enable a likelihood statistic to be generated between incoming frames, defined below, and the target patterns. Thus, the target patterns consist of an array wherein the entries comprise the mean, standard deviation and area normalization factor for a corresponding collection of design set pattern array entries. A more refined likelihood statistic is described below.

It will be obvious to those skilled in the art that substantially all words will have more than one contextual and/or regional pronounciation and hence more than one "spelling" of design set patterns. Thus, a vocabulary word having the patterned spelling $P_1, P_2, ...$ referred to above, can in actuality be generally expressed as $p(i)_1, p(i)_2, ... i = 1, 2, ..., M$ where each of the $p(i)_j$ are possible alternative descriptions of the jth class of design set patterns, there being a total of M different spellings for the word.

The target patterns $t_1, t_2, ..., t_i, ...$, in the most general sense, therefore, each represent plural alternative statistical spellings for $i^{th}$ group or class of design set patterns. In the illustrated embodiment described herein, the term "target pattern" is thus used in the most general sense and each target pattern may therefore have more than one permissible alternative "statistical spelling."

Preprocessing of the incoming unknown audio signals and the audio forming the reference patterns is now complete.

Processing the Stored Spectra

Figure 4:
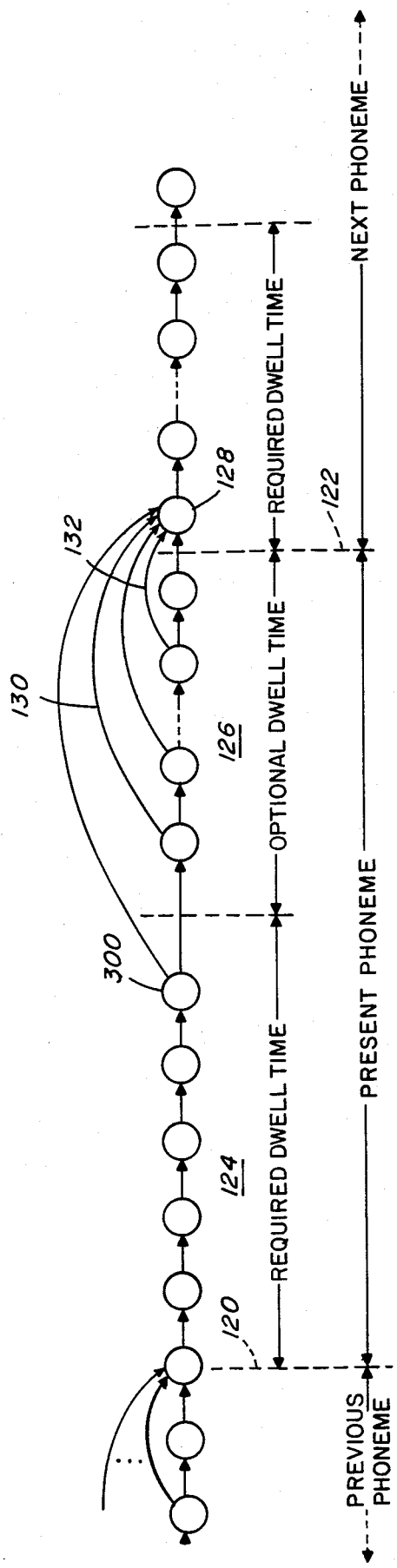
FIG. 4 is a graphical representation of the pattern alignment process according to the invention.

A more indepth study of the keyword recognition method of concatenating phonetic patterns into detected words, described in U.S. Pat. Nos. 4,241,329, 4,227,177, and 4,227,177, has shown that it is a special case of a more general and possibly superior recognition method. Referring to FIG. 4, the word recognition search can be represented as the problem of finding an appropriate path through an abstract state space. In the figure, each circle represents a possible state, also designated a dwell time position or register, through which the decision making process can pass. The space between dashed vertical lines 120, 122 represents each of the hypothetical states in which the decision making process can pass in determining whether a pattern matches or does not match a current phoneme. This space is divided into a required dwell time portion 124 and an optional dwell time portion 126. The required dwell time portion is the minimum duration of the particular "current" phoneme or pattern. The optional dwell time portion represents the additional maximum duration of a pattern. Each of the circles within the optional or required dwell time portions represents one frame time of the continuum of formed frames and corresponds to the 0.01 second intervals from frame to frame. Thus, each circle identifies a hypothesized current phonetic position in a word spelling and, together with the number of (0.01 second) frames hypothesized to have elapsed since the current phoneme began, corresponding to the number of earlier "circles" or positions in that phoneme or target pattern, represents the present duration of the pattern. After a pattern (phoneme) has begun and the minimum dwell time interval has elapsed, there are several possible paths of advancing to the first node or position (circle) 128 of the next target pattern (phoneme). This depends upon when the decision to move to the next pattern (phoneme) of the spelling is made. These decision possibilities are represented in the figure by the several arrows leading to circle 128. A transition to the next pattern (phoneme), the beginning of which is represented by circle 128, might be made at any node or position during the optional dwell time of the current pattern (phoneme) or at the last node of the required dwell time interval.

The key word recognition method described in U.S. Pat. Nos. 4,241,329; 4,227,176; and 4,227,177, makes the transition at the first such node for which the likelihood score relative to the next pattern (phoneme) is better than the likelihood score relative to the current pattern (phoneme). That is, a frame matches the next phoneme or pattern better than the present phoneme or pattern. The total word score, however, is the average pattern (phoneme) score per frame (i.e., per node included in the path). This same "total score" definition applied to a word score up to the current node can be used to decide when to make the transition; that is, whether to make the transition to the next pattern at say a first opportunity, corresponding for example to a transition indicating line 130, or at a later time, corresponding to, for example, a transition indicating line 132. Optimally, one chooses that path into the next pattern (phoneme) for which the average score per node is best. Since the standard keyword method described in U.S. Pat. Nos. 4,241,329, 4,227,176, and 4,227,177, does not examine any of the potential paths after it has made the decision to move to the next pattern (phone), it may make a sub-optimal decision as measured by average score per node.

Accordingly, the present invention employs an average score per node strategy for word string recognition. The problem arises, when used in connection with word string recognition as described in detail hereinafter, that one must either normalize all partial word scores by the number of nodes included, which is computationally inefficient, or else one must bias the accumulation so that an explicit normalization is not necessary. A natural bias to use in the closed vocabulary task is the unnormalized score for the best word ending at the present analysis time; then the accumulated scores at all nodes will always be the sum of the same number of elementary pattern scores. Furthermore the score is transformed by this bias into the score of the best string of words ending at the current analysis node.

The average score per node decision strategy is efficiently implemented in the Vector Processor described in U.S. Pat. No. 4,228,498, by a dynamic programming technique. When programmed in this manner the processing speed is somewhat faster than for the standard key word recognition method described in U.S. Pat. Nos. 4,241,329; 4,227,176; and 4,227,177, even though more hypothesis tests are required.

Generally speaking, to recognize strings of words, the program remembers the name of the best hypothesized vocabulary word ending at each analysis node. It also remembers the node (time) at which this best word began. The best string of words is then found by tracing back from the end of the utterance, noting the stored word name and finding the next previous word at the indicated beginning time of the current word.

By including silence as a vocabulary word, it becomes unnecessary to specify how many words are contained in the string of words. The operation of tracing back to find the string is executed whenever the silence word has the best word score, and the operation terminates at the next previously detected silence. Thus a string is found every time the talker pauses for breath.

The word string recognition method described herein is one level of abstraction higher than the detection of individual key words. Since the word string scoring forces all speech throughout the utterance to be included in some word of the string, it has an advantage over the simpler word spotting approach, which frequently detects false sort words within longer words.

Advantageously no timing patterns are necessary for the word string, since the word concatenator outputs a word beginning time for each word ending hypothesis. The simplest string concatenator assumes that these word beginning times are correct. On detecting silence, it assumes that the string of words has just ended, and that the beginning of the last word is the end of the previous word (which may be silence). It is then a simple matter to trace backward through the string, choosing the word with the best ending score at each word boundary. Since there is usually a context-dependent transition between each pair of words in the string, it may be preferable to permit the apparatus to search the neighborhood of each word beginning for the best ending of the previous word.

The method and apparatus, including hardware and software embodiments are now described in greater detail.

Referring to FIG. 3, the stored spectra, or frames, at 95, representing the incoming continuous audio data, are compared with the stored template of target patterns indicated at 96, representing keywords of the vocabulary according to the following method.

For each 10 millisecond frame, a pattern for comparison with the stored reference patterns is formed at 97 by adjoining the current spectrum vector s(j,t), the spectrum s(j,t−0.03) from three frames ago, and the spectrum s(j,t−0.06) from six frames ago, to form a 96 element pattern:

$$x(j,t) = \begin{cases} s(j, t - .06), j = 0, \ldots, 31 \\ s(j - 32, t - .03), j = 32, \ldots, 63 \\ s(j - 64, t), j = 64, \ldots, 95 \end{cases}$$

As noted above, the stored reference patterns consist of the mean values, standard deviations, and area normalizing terms of previously collected 96 element patterns belonging to the various speech pattern classes to be recognized. The comparison is accomplished by a probability model of the values x(j,t) to be expected if the input speech belongs to a particular class.

While, a Gaussian distribution can be used for the probability model, (see e.g. U.S. Pat. Nos. 4,241,329; 4,227,176; and 4,227,177, referred to above), the Laplace distribution $$p(x) = (1/\sqrt{2}s') \exp -(\sqrt{2} |x - m|/s')$$

(where m is the statistical mean and s' the standard deviation of the variable x) requires less computation and has been found to perform nearly as well as the Guassian distribution in, for example, the talker independent, isolated word recognition method described in U.S. Pat. No. 4,038,503. The degree of similarity $L(x|k)$ between an unknown input pattern x and the kth stored reference pattern is proportional to the logarithm of the probability and is estimated at 100 by the following formula:

$$L(x|k) = \sum_{i=1}^{96} \frac{|x_i - u_{ik}|}{s'_{ik}} + A_k \quad (17)$$

$$\text{where } A_k = \frac{1}{2} \sum_{i=1}^{96} \ln s'_{ik}$$

In order to combine the likelihood scores L of a sequence of patterns to form the likelihood score of a spoken word or phrase, the score $L(x|k)$ for each frame is adjusted by subtracting the best (smallest) score of all the reference patterns for that frame, as follows:

$$L'(x|k) = L(x|k) - \min_i L(x|i) \quad (18)$$

Thus the best-fitting pattern on each frame will have a score of zero. The adjusted scores for a hypothesized sequence of reference patterns can be accumulated from frame to frame to obtain a sequence score related directly to the probability that a decision in favor of the indicated sequence would be the correct decision.

Comparison of unknown input spectrum patterns against stored known patterns is accomplished by computing the function $$q = \sum_{i=1}^{96} \bar{s}_{ik} |x_i - u_{ik}| + c_k \quad (19)$$

(where $\bar{s}_{ik}$ equals $1/s'_{ik}$) for the kth reference pattern. In a normal software implemented computation, the following instructions would be executed to compute the algebraic function $\bar{s}|x-u|$ (of Equation 19):
1. compute $x-u$
2. test the sign of $x-u$
3. if $x-u$ is negative, negate to form the absolute value
4. multiply by $\bar{s}$
5. add the result into an accumulator In a typical speech recognition system having a 20-word vocabulary, there would be about 222 different reference patterns. The number of steps required to evaluate them is then $5 \times 96 \times 222 = 106560$ steps, not including overhead operations, and this must be done in less than 10 milliseconds in order to keep up with the real time spectrum frame rate. The processor must therefore be capable of executing nearly 11 million instructions per second just to evaluate the likelihood functions. In view of the necessary speed, a special purpose likelihood function hardware module 200 (FIG. 4), which is compatible with a system Vector Processor as disclosed in U.S. Pat. No. 4,228,498, is employed.

In this special purpose hardware, the five steps listed above are performed simultaneously with two sets of the arguments $\bar{s}$, x, u; so that in effect ten instructions are performed in the time it normally takes to execute one instruction. Since the basic Vector Processor operates at a rate of 8 million instructions per second, the effective computation rate for the likelihood function becomes about 80 million instructions per second with the special purpose hardware module 200 being employed.

Figure 5:
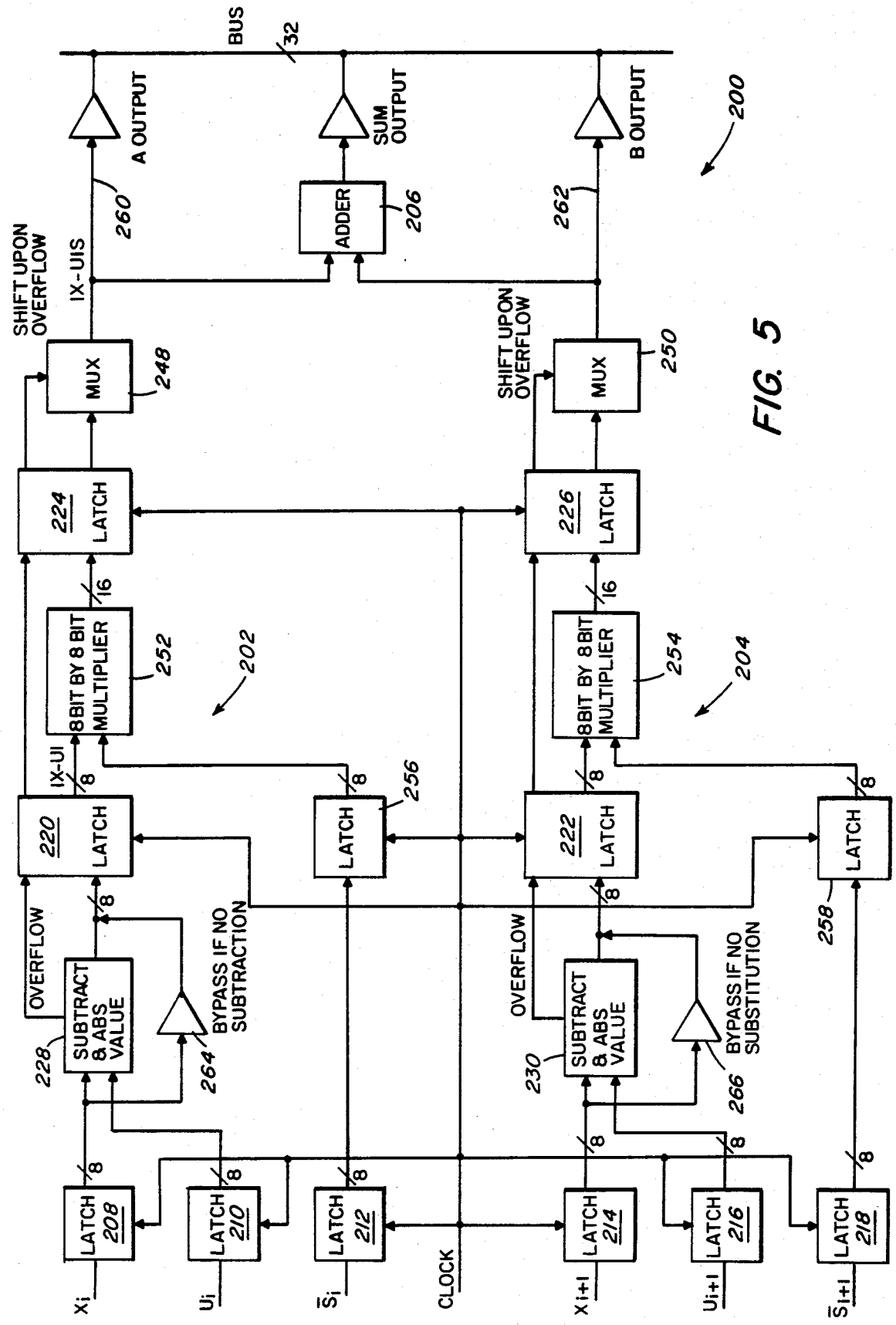
FIG. 5 is an electrical block diagram of a likelihood function processor according to a preferred embodiment of the invention.

Hardware module 200, referring to FIG. 5, employs a combination of hardware pipelining and parallel processing to provide the simultaneous execution of the ten steps. Two identical sections 202, 204 each perform five arithmetic steps upon the independent input data arguments and the two results are combined by an adder 206 connected to their outputs. The accumulation of the summations from adder 206 form the summation from 1 to 96 of Equation 19 and is handled by the arithmetic unit of the standard Vector Processor described in U.S. Pat. No. 4,288,498.

In operation, pipelining registers hold the intermediate data at the following stages of the processing:
1. input arguments (clocked registers 208, 210, 212, 214, 216, 218)
2. absolute value of $x-u$ (clocked registers 220, 222)
3. output of multiplier (clocked registers 224, 226)

Figure 6:
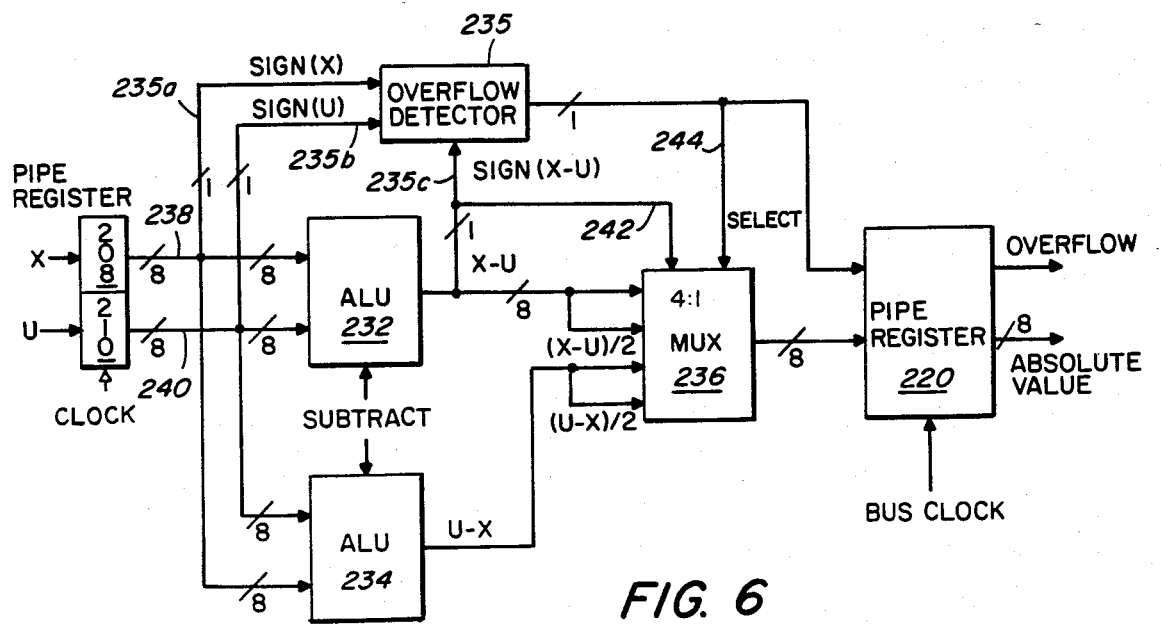
FIG. 6 is an electrical schematic block diagram of the subtract and absolute value circuit according to a preferred embodiment of the invention.

With the input data held in clocked registers 208-218, the magnitude of $x-u$ is determined by subtract and absolute value elements 228, 230. Referring to FIG. 6, the subtraction and absolute value elements 228, 230, each contain first and second subtracters 232, 234, one to find $x-u$ and the other to find $u-x$, and a multiplexer 236 to select the positive result. The input arguments x and u over lines 238, 240 from registers 208, 210 respectively, are 8-bit numbers ranging from $-128$ to $+127$. Since the difference output of the 8-bit subtracter may overflow to 9 bits (for example, $(127 -(-128)=255)$, extra circuitry is needed and employed to handle an arithmetic overflow condition. (The condition is determined by an overflow detector 235 whose inputs are the sign of "x" (over a line 235a), the sign of "u" (over a line 235b) and the sign of "x−u" (over a line 235c).)

The overflow detectors, referring to FIG. 7, are, in this illustrative embodiment, combinatorial circuits having three-input AND gates 268, 270, and an OR gate 272. The truth table of FIG. 8 defines the overflow condition as a function of its inputs.

The overflow condition is handled by providing four choices in the multiplexer 236, the element which selects the positive subtractor output. The choices are defined by the binary levels on lines 242 and 244. The level on line 242 represents the sign of $x-u$. The sign on line 244 represents an overflow if "1". Thus the choices are:

| line 242 | line 244 | |
|---|---|---|
| 0 | 0 | select the subtracter 232 output |
| 1 | 0 | select the subtracter 234 output |
| 0 | 1 | select the subtracter 232 shifted down 1 bit |

| line 242 | line 244 | -continued |
|---|---|---|
| 1 | 1 | select the subtracter 234 shifted down 1 bit |

The multiplexer is thus controlled to act like an 8-pole, 4-position electrical switch. The "shift" operation is performed combinatorially by connecting (gating) the subtracter outputs to the appropriate multiplexer inputs. The shift has the effect of dividing arithmetically by two.

If an overflow has occurred during the subtraction, the output of the multiplexer will be the output of a subtractor divided by two. It is therefore necessary to remember that condition later in the computation so that the final result can be multiplied by two, to restore the correct scale factor. This restoration occurs at the output of the multiplier after the final pipelining register. Therefore an extra bit is provided in the pipeline registers 220, 222, 224, 226 to control second multiplexers 248, 250 which shift, respectively, the multiplicative product of an 8×8 bit multiplier 252, 254 up by one bit, to multiply by two, whenever the overflow bit is set (equal to "1"). The multiplication arithmetic is carried out in a standard commercial integrated circuit device, such as the TRW part number MPY-8-HJ, which accepts two 8-bit numbers and outputs their product.

Multipliers 252, 254 thus produce the product of $\bar{s}$ and $|x-u|$ at each clock pulse (the value of $\bar{s}$ being properly timed by the extra data registers 256, 258). The outputs of multipliers 252, 254 are buffered in registers 224, 225 and are output to the remaining circuit apparatus over lines 260, 262 and through adder 206.

The same special purpose hardware module 200 is also employed for computing the inner product of two vectors, as required in matrix multiplication. This is accomplished by gating circuits 264, 266 which permit bypassing, in the subtraction and absolute value circuit, components 228, 230. In this mode of operation, the data "x" and "$\bar{s}$" input buses are applied directly to the pipeline registers 220, 222, as the multiplier inputs.

Word level pattern alignment

A dynamic programming method (at 101) is preferably employed to optimize the correspondence between unknown input speech and each vocabulary word template. Each word template consists not only of the sequence of reference pattern statistics referred to above, but also a minimum and maximum dwell time associated with each reference pattern. Accordingly to the dynamic programming approach, a set of storage registers is provided for each vocabulary word. The number of registers is equal to the sum of the maximum dwell times of the reference patterns making up that word; i.e., it is proportional to the longest permissible word duration. These registers correspond to the circles in FIG. 2, one register for each circle.

For every frame of input speech, all the registers are read and written. Each register will contain, as described in detail below, the accumulated likelihood score corresponding to the hypothesis that the indicated vocabulary word is being spoken and that the current position in the word corresponds to the particular reference pattern and dwell time associated with that register. All the registers are initialized to contain poor likelihood scores, to indicate that initially none of the represented hypotheses is acceptably likely.

The rules for updating the registers are as follows. The first register of each word template, (i.e., the register corresponding to the hypothesis that the word has just begun to be uttered) contains the sum of (a) the likelihood score of the present frame relative to the first reference pattern of the word and (b) the best score of all last registers of all vocabulary words (i.e., the accumulated likelihood score for the hypothesis that some word was completed on the previous frame).

The second register of a word template contains the sum of (a) the likelihood score of the present frame relative to the first reference pattern of the word and (b) the contents of the first register from the previous frame. Thus the second register contains the score of the hypothesis that the indicated word is being uttered and that it began on the previous frame.

During the process of updating those registers corresponding to dwell times between the minimum and maximum duration, (the optional dwell interval), a separate memory register is employed to store the best accumulated likelihood score (register content) in the registers corresponding to optional dwell time interval for each successive "present frame". This best score, found at the previous frame time, is used to calculate the next contents of the first register corresponding to the required dwell time interval of a next target pattern or template for the word. Thus, the present contents of the first register of the next reference pattern is generated by adding that best score (of the previous target pattern) to the likelihood score of the present input frame relative to the said next reference or target pattern.

In FIG. 4, the multiple arrows leading in to the first register 128 of the required dwell interval of a reference pattern are meant to indicate that the transition from the optional register or state to required dwell time register or state can occur at any time during the optional dwell time interval or from the last register of the required dwell time interval. Thus on the basis of current information, the best fitting correspondence between word template and the input patterns is the one which hypothesizes that when the next pattern is just beginning, the previous pattern has had a duration corresponding to the register containing the best score in the preceding optional dwell interval (plus the last register of the previous required time interval, register 300 in the illustrated embodiment). According to the theory of dynamic programming it is not necessary to save previously accumulated scores corresponding to all possible dwell times, since, according to the theory any dwell time transition which produced a worse score will continue to produce worse scores at all future stages of processing.

Analysis proceeds in the manner described using all registers of all reference patterns of all word templates. The last register(s) of the last pattern of each word template contains the score of the hypothesis that that word has just ended.

During the accumulation of likelihood scores, a sequence of duration counts is kept for determining the duration of the best word ending at each frame time. The count is initiated at "one" at the first register of the first template pattern of the word. For each second and succeeding register, of a template pattern, the count associated with the previous register is incremented by "one". However, for each register corresponding to the beginning of a reference pattern (other than the first reference pattern of a word), that is, for example, the first register 128 of the required dwell time interval, it is the count of optional dwell time register (or last required dwell time register) of the previous reference pattern, having the best likelihood score in the previous frame time, that is incremented to form the duration count for the register.

In order to provide a mechanism for "tracing back" as described in more detail below, for each frame time, the identification of the best scoring word ending at that time, and its duration, are transferred to a circulating buffer memory. When a sequence of words ends, the stored word durations permit tracing backward, from the end of the last "best" word, via its duration, to the best preceeding word ending just prior to the "last word", etc., until all words of the word string have been identified.

Strings of continuously uttered vocabulary words are bounded by silence. One of the word templates therefore corresponds to silence, or background noise. Whenever the silence word has the best likelihood score, it is presumed that a sequence of words has just ended. A flag register is tested to see if any word other than silence has had the best score since the last initialization of the recognition process. If at least one word other than "silence" has had a "best score" (at 103), the word string in the circulating buffer is traced backwards (at 105) and the resulting recognized message is transmitted to a display or other controlled equipment. Then the circulating buffer is cleared to prevent repeated transmission of the message, and the flag register is cleared. The apparatus is thus initialized to recognize the next "word string" (at 107).

Training of reference patterns

To obtain sample means, u, and variances, s', for construction of reference patterns, a number of utterances of each vocabulary word are entered into the speech recognition system and the ensemble statistics of corresponding preprocessed spectrum frames are evaluated. Crucial to successful operation of the equipment is the choice of which input spectrum frames should correspond to which target or reference patterns.

In the absence of better information such as manually chosen significant acoustical phonemes for the input word, the time interval between the beginning and end of a spoken word is divided into a number of uniformly spaced subintervals. Each of these subintervals is forced to correspond to a unique reference pattern. One or more three-frame patterns beginning in each interval are formed and classified according to the reference pattern associated with that interval. Subsequent examples of the same vocabulary word are similarly divided into a like number of uniformly spaced intervals. The mean values and variances of the elements of the three-frame patterns extracted from correspondingly ordered intervals are accumulated over all available examples of the vocabulary word to form the set of reference patterns for that word. The number of intervals (number of reference patterns) should be in the order of two or three per linguistic phoneme contained in the vocabulary word.

For best results, the start and end of each vocabulary word are marked through a procedure involving manual examination of the recorded audio waveform and spectrum frames. To implement this procedure automatically, it is necessary to have words spoken one at a time, bounded by silence, in order for the apparatus to find word boundaries accurately. The reference patterns may be initialized from one such sample of each word spoken in isolation, all variances being set to a convenient constant in the reference patterns. Thereafter the training material may comprise utterances typical of those to be recognized, with word and segment boundaries as found by the recognition process.

After statistics from a suitable number of training utterances have been accumulated, the reference patterns so found replace the initial reference patterns. A second pass through the training material is then made. This time the words are divided into intervals on the basis of the decisions made by the recognition processor as in FIG. 3. Every three-frame input pattern (or one typical input pattern for each reference pattern) is associated with some reference pattern by the previously described pattern alignment method. Mean values and variances are accumulated a second time to form the final set of reference patterns derived in a manner wholly compatible with the method in which they are to be used by the recognition apparatus.

During each of the training passes, it is preferable to ignore any training phrase which is not correctly recognized by the recognition processor, since a misrecognized utterance is likely to have poorly placed interval boundaries. On completion of the training pass, the previously misrecognized phrases can be attempted again with the new reference patterns, and the reference patterns can be further updated if recognition is then successful.

An alternative to ignoring the misrecognized phrases is to form a multiple-word template for each training utterance. This template is simply a concatenation of the templates for each of the words in the utterance in the correct order. The talker is prompted by a script to speak the indicated word sequence, and the recognition processor references only the multiple template and the silence template. The word boundaries and reference pattern classification will then be optimal for the given script and available reference patterns. A disadvantage of this procedure is that a larger number of passes through the training script may be required.

For highest possible recognition accuracy it is preferrable to begin the training procedure with a set of previously determined talker-independent reference patterns for the vocabulary to be recognized. The talker-independent patterns are obtained from phrases typical of those to be recognized, spoken by at least several different talkers. The word boundaries may be determined by manual examination of recorded audio waveforms. Then the two step procedure just described is employed to develop the talker-independent patterns: in the first pass, subintervals are uniformly spaced within each word; in the second pass, subintervals are as determined by the recognition process using the first-pass reference patterns. Ensemble statistics over all talkers are derived in each pass. To train the system to a particular talker, the talker-independent patterns are employed as if they were the product of the first training pass; and only the procedure of the second pass is performed (possibly twice).

The minimum (required) and maximum (required plus optional) dwell times are preferably determined during the training process. According to the preferred embodiment of the invention, the apparatus is trained as described above, using several speakers. Further, as described above, the recognition process automatically determines, during the training procedure, pattern boundaries in accordance with the process described above. Thus boundaries are recorded and the dwell times for each of the apparatus identified keywords are stored.

At the end of a training run, the dwell times for each pattern are examined and the minimum and maximum dwell times for the pattern are chosen. According to a preferred embodiment of the invention, a histogram of the dwell time is generated and the minimum and maximum dwell times are set at the twenty-fifth and seventy-fifth percentiles. This provides a high recognition accuracy while maintaining a low false alarm rate. Alternately, other choices of minimum and maximum dwell times can be chosen, there being a trade off between recognition accuracy and false alarm rate. Thus, if a low minimum dwell time and large maximum dwell time are chosen, a higher recognition accuracy will generally result at the cost of a correspondingly high false alarm rate.

Syntax processor

Figure 9:
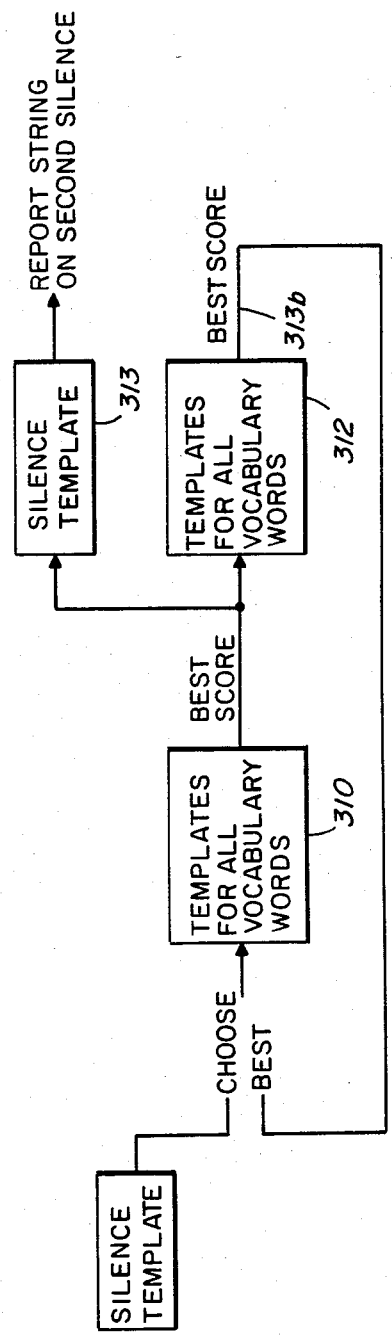
FIG. 9 is a schematic flow representation of a syntax processor according to one particular embodiment of the processor of the invention.

Concatenation of two or more specific word templates is a trivial example of syntax control in the decision process. Referring to FIG. 9, a syntax circuit arrangement 308 to detect word sequences containing an odd number (1,3,5,7, ...) of words has two independent sets of pattern alignment registers 310, 312, maintained for each vocabulary word. The entering score for the first template is the score for silence or the best score from the set of second templates, whichever is better. The entering score for the second template is the best score from the first set of templates. This score also feeds a second silence detector template at node 313. On detection of silence at the end of the utterance, as measured by the detector template at node 313, the labels and durations of the words uttered may be traced back alternately from the traceback buffers of the first and second set of templates. Importantly, the position of the silence detector template ensures that only silence after a word sequence having an odd number of words can be detected.

Somewhat more complex syntax networks may be implemented by associating with each syntax node such as nodes 313a and 313b of FIG. 9, a list of acceptable word string lengths (see pp. 10–11 of the flow chart of Appendix A). For example, in the syntax network of FIG. 9 which accepts any string containing an odd number of words, the string length may be fixed at a particular odd number, say 5, by examining the string length at the input to the second silence register 313a. If the length of the string at that point is not 5, the register becomes inactive (for the present analysis interval), and no string score can be reported from that register; but if the string length is 5, a string detection can be reported. Similarly the first vocabulary register 310 can be enabled if the incoming string length is 0, 2, or 4 and the second register only if the incoming string length is 1 or 3. Although the optimal results for a five-word string would require five complete sets of dynamic programming accumulators, this method permits a lesser number of accumulators to perform multiple duty with only a slight reduction in typical recognition accuracy.

The Realized System Using the Speech Recognition Method

As indicated previously, a presently preferred embodiment of the invention was constructed in which the signal and data manipulation, beyond that performed by the preprocessor of FIG. 2, was implemented on and controlled by a Digital Equipment Corporation PDP-11 computer working in combination with the special purpose Vector Computer Processor such as that described in copending U.S. Pat. No. 4,228,498.

The detailed programs which provide the functions described in relation to the flow-chart of FIG. 3 are set forth in the appendices (not printed herewith). The program printouts are in the MACRO-11 and FORTRAN languages provided by the Digital Equipment Corporation with its PDP-11 computers and in the machine language of the special purpose processor.

Appendix 1 is the operating program for an interactive system demonstration incorporating the speech recognition operation of the present invention and providing responses and instruqtions to the system operator. The interactive program itself forms no part of the present invention, and it is not described in detail in the specification. However, those skilled in the programming art will be able to follow how the interactive program may be employed both to generate design set patterns and to indicate detections of word strings. Appendix 2 is a flow chart of the speech recognition portion of the program.

The interactive program of Appendix 1 employs various subroutines and Appendix 3 consists of a printout of those subroutines.

In addition to the use of a computer programming implementation of the inventive method, a hardware implementation of the inventive method can be employed.

Figure 10:
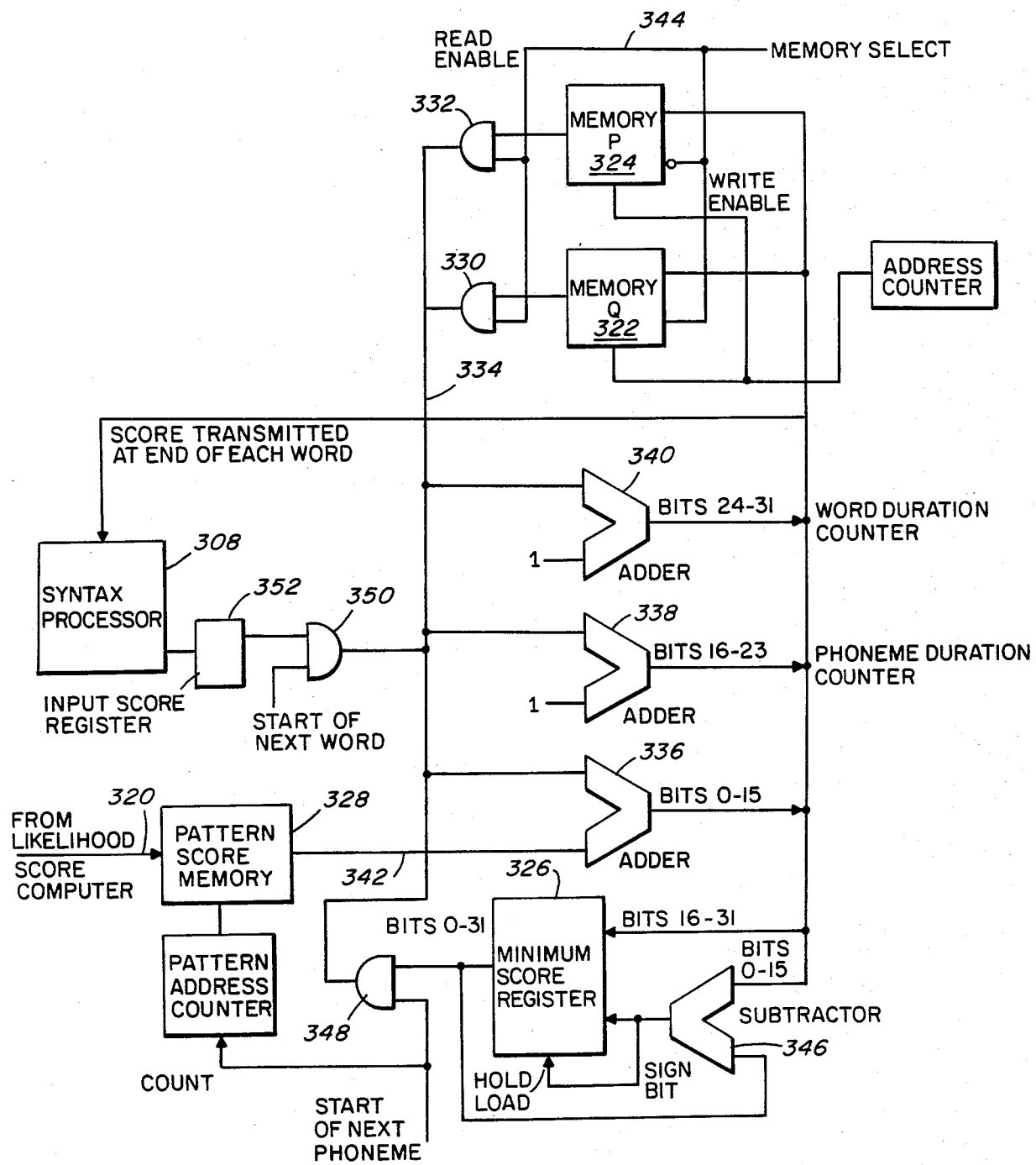
FIG. 10 is an electrical block diagram showing a sequential decoding pattern alignment circuit configuration according to a preferred particular embodiment of the invention.

In operation, the apparatus of FIG. 10 operates in accordance with the dynamic programming technique. Each new likelihood score sequence that is, the sequence of likelihood scores relative to each reference pattern in a known predetermined order, from the computer over lines 320 is added to existing scores in one of memories 322 and 324. These memories alternate functions as described below, under the control of (a) the syntax processor 308 which receives the scores corresponding to the end of each possible word, (b) a minimum score register 326 which can replace the output of memories 322 and 324 depending upon the memory select and next phoneme signals, and (c) the other control and clock signals.

In operation, the circuit follows the rules for updating the registers corresponding to each of the "circles" of FIG. 4 to provide at each rest or silence recognition a decision mechanism by which the best "match" can be achieved.

Memories 322 and 324 have the same configuration and are interchanged every ten milliseconds, that is, every time a new frame is analyzed. The memories each contain a plurality of thirty-two bit words, the number of thirty-two bit words corresponding to the total number of registers (or circles in FIG. 4) associated with the words of the machine vocabulary. Initially, one memory, for example memory 322, is filled with "bad" likelihood scores; that is, scores which in the present example have a large value. Thereafter, the memory 322 is read sequentially, in a predetermined sequence corresponding to the sequence of new likelihood scores from the Vector Processor over line 320 and the scores are then updated as described below and rewritten into the other memory, memory 324. In the next ten millisecond frame, the now old scores from memory 324 are read and new scores are written into the now other memory 322. This alternating function or relationship continues under the control of the syntax processor, the minimum score register 326, and other control and clock signals.

As noted above, each word of memories 322 and 324 is a 32 bit number. The lower 16 bits, bits 0–15, are employed to store the accumulated likelihood scores. In addition, bits 16–23 are employed for recording the phoneme duration and bits 24–31 are employed for storing the word durations at that register.

The incoming likelihood scores from the computer are stored, for each frame time in a pattern score memory 328. This information is provided in a "burst" from the computer, at a very high data transfer rate, and is read out of the pattern score memory at a slower rate employed by the circuitry of FIG. 10. Thus, absent any interceding control from the syntax processor or the minimum score register, the output of the selected memory 322 or 324, through the corresponding selected gate 330 or 332, is applied to lines 334. The lines 334 are connected to adders 336, 338, 340 for updating the likelihood score, the phoneme or target pattern duration count, and the word duration count respectively. Thus, the likelihood score corresponding to the "previous frame" score coming from one of memories 322, 324 is output from the pattern score memory over lines 342, added to the old likelihood score, and is then stored in the memory not being used for writing. The memory select function is provided by the signal level on lines 344. Simultaneously, the word and phoneme duration counts are incremented by "one".

In this manner, the word duration counter, the phoneme duration count and the likelihood scores are normally updated.

The two exceptions for the usual updating rule recited above correspond to the beginning of a new phoneme and the beginning of a new word. At the beginning of a new phoneme, which is not the beginning of a new word, the first register of the phoneme is not updated in accordance with the usual rule; but instead, the likelihood score over line 342 is added to the minimum score from the previous reference frame or phoneme optional dwell time registers or the last register of the previous phoneme required dwell time. This is implemented by employing the minimum score register 326. The output of the minimum score register represents the minimum score in the previous frame time for the earlier phoneme. This score is attained by continuously updating the contents of the minimum score register whenever a new "minimum score" is provided. The new minimum score is loaded into the minimum score register by employing the sign bit output of a subtraction arithmetic element 346. Element 346 effectively compares the present minimum score with the new minimum score from the just updated register. The minimum score register further stores the word duration count and phoneme duration count corresponding to the register having the minumum score. All of this information is output onto lines 334 at the start of a new phoneme. This output process is controlled using the gating element 348, enabled at the start of a new phoneme, in combination with control signals to gates 332 and 330 which disable those gates from operation during the start of a new phoneme.

The syntax processor 308 is employed for updating the first register of the first phoneme for a new word, with the best score, taking into account the syntax, of a word ending in the previous frame. Thus, when the score of a register corresponding to the first register of the first phoneme of a new word is to be updated by an incoming likelihood score, it is not the output of one of memories 322,324 which is employed. Instead, it is the best likelihood score, preferably taking into account syntax, for the words ending in the previous frame. This function is enabled by disabling gates 330 and 332, and simultaneously enabling a gate 350 for placing the best available score, stored in a register 352, onto lines 334, for addition with the incoming pattern likelihood score over lines 342.

In this manner, therefore, each register corresponding to a dwell time of a reference frame is continuously updated in this hardware embodiment. When the likelihood scores represent the silence word, the syntax processor is designed to provide the necessary control systems for enabling a hardware or computer apparatus to track backwards to determine the recognized words.

In view of the foregoing, it may be seen that several objects of the present invention are achieved and other advantageous results have been obtained.

It will be appreciated that the word string continuous speech recognition method and apparatus described herein include isolated speech recognition as a special application. Additions, subtractions, deletions, and other modifications of the described preferred embodiments, will be obvious to those skilled in the art, and are within the scope of the following claims.

What is claimed is:

1. In a speech analysis apparatus for recognizing at least one keyword in an audio signal, each keyword being characterized by a template having at least one target pattern, each target pattern representing at least two short-term power spectra, and each target pattern having associated therewith at least two required dwell time positions and at least one optional dwell time position, the recognition method comprising the steps of:

forming at a repetitive frame time, a sequence of input frame patterns from and representing said audio signal, each frame pattern being associated with a frame time, successive frame patterns corresponding to successive dwell time positions, generating a numerical measure of the similarity of each said frame pattern with each of said target patterns, accumulating for each said target pattern required dwell time position and each said target pattern optional dwell time position, and using said numerical measure of the similarity of the just formed frame pattern and said each target pattern, a numerical value representing the alignment of the just formed frame pattern with the respective target pattern dwell time position, and generating a recognition decision, based upon said numerical values, when a predetermined sequence occurs in said audio signal.

2. The method of claim 1 wherein said accumulating step comprises the steps of accumulating for each target pattern second and later required dwell time position, and for each target pattern optional dwell time position, the sum of the accumulated score for the previous target pattern dwell time position during the previous frame time and the present numerical measure associated with the target pattern, accumulating, for each keyword first target pattern, first required dwell time position, the sum of the best accumulated score, during the previous frame time, which is associated with the end of a keyword, and the present numerical measure associated with the keyword first target pattern, and accumulating, for each other target pattern first required dwell time position, the sum of the best ending accumulated score for the previous target pattern of the same keyword and the present numerical measure associated with the target pattern.

3. The method of claim 2 further comprising the steps of
storing in association with each frame time position, the identity and duration, in frame time position, of the keyword having best score and a valid ending at each said frame time position, and
wherein said decision generating step comprises the step of
tracing back through said stored keyword indentity and duration information for determining each keyword in a word string.

4. The method of claim 3 further comprising the step of
storing, in association with each dwell time position accumulated score, a word duration count corresponding to the time position length of the keyword associated with the accumulated score at the dwell time position.

5. The method of claim 4 further comprising the step of
storing, in association with each dwell time position accumulated score, a target pattern duration count corresponding to the position sequence of the dwell time position in the target pattern.

6. The method of claim 1 wherein said decision generating and accumulating steps comprise
directing the transfer of accumulated scores in response to a syntax generating element.

7. An apparatus for recognizing at least one keyword in an audio speech signal, each keyword being characterized by a template having at least one target pattern, each pattern representing at least two short term power spectra, and each target pattern having associated therewith at least two required dwell time positions and at least one optional dwell time position, the recognition apparatus comprising,
means for forming, at a repetitive frame time rate, a sequence of input frame patterns from, and representing, said audio signal, each frame pattern corresponding to a said frame time, and successive frame patterns corresponding to successive dwell time positions,
means for generating a numerical measure of the similarity of each said frame pattern with each of said target patterns,
means for accumulating, for each said target pattern required dwell time position and each said target pattern optional dwell time position, and using said numerical measure of the similarity of the just formed frame pattern and said each target pattern, a numerical value representing the alignment of the just formed audio representing frame pattern with the respective target pattern dwell time position, and
means for generating a recognition decision, based upon the accumulated numerical values, when a predetermined sequence occurs in said audio signal.

8. The apparatus of claim 7 further comprising
means for recognizing said predetermined sequence in said audio signal and for employing said predetermined sequence as a control signal.

9. The apparatus of claim 8 wherein said predetermined sequence is a silence pattern.

10. The apparatus according to claim 7 wherein said accumulating means comprises
first means for accumulating for each target pattern second and later required dwell time position and each target pattern optional dwell time position, the sum of the accumulated score for the previous target pattern dwell time position during the previous frame time and the present numerical measure associated with the target pattern,
second means for accumulating, for each keyword first target pattern, first required dwell time position, the sum of the best accumulated score during the previous frame time which is associated with the end of a keyword, and the present numerical measure associated with the keyword first target pattern, and
third means for accumulating, for each other first target pattern, first required dwell time position, the sum of the best ending accumulated score for the previous target pattern of the same keyword and the present numerical measure associated with the target pattern.

11. The apparatus according to claim 10 further comprising
means for storing in association with each frame time position, the identity and duration, in frame time positions, of the keyword having the best score and a valid ending at each said frame time position, and
wherein said decision generating means comprises
means for tracing back through the stored keyword identity and duration information for identifying each keyword in a word string.

12. The apparatus of claim 11 further comprising
means for storing in association with each dwell time position accumulated score, a word duration count corresponding to the time position length of the keyword associated with the accumulated score at the dwell time position.

13. The apparatus of claim 12 further comprising
second means for storing, in association with each dwell time position accumulated score, a target pattern duration count corresponding to the time of the dwell time position in the target pattern.

14. The method of claim 7 wherein the decision generating and accumulating means comprise
means for directing the transfer of accumulated scores in response to a syntax generating element.

15. In a speech analysis apparatus for recognizing at least one keyword in an audio signal, each keyword being characterized by a template having at least one target pattern, each target pattern representing at least two short-term power spectra, and each target pattern having associated therewith at least two required dwell time positions and at least one optional dwell time position, said dwell time positions defining the limits during which a said target pattern can match an incoming sequence of frame patterns, a method for forming said target patterns representing said keywords comprising the steps of:
dividing an incoming audio signal corresponding to a keyword into a plurality of subintervals,
forcing each subinterval to correspond to a unique target pattern,
repeating said dividing and forcing steps upon a plurality of audio input signals representing the same keyword, generating statistics describing the target pattern associated with each subinterval, and making a second pass through said audio input signals representing said keyword, using said assembled statistics, for providing machine generated subintervals for said keywords.

16. The method of claim 15 wherein said subintervals are initially spaced uniformly from the beginning to the end of an audio input keyword.

* * * * *